United States Patent [19]

Beckmann

[11] 4,441,261
[45] Apr. 10, 1984

[54] METHOD AND APPARATUS FOR COOLING HOT BULK MATERIAL

[75] Inventor: Georg Beckmann, Vienna, Austria

[73] Assignee: Waagner Biro Aktiengesellschaft, Austria

[21] Appl. No.: 268,828

[22] Filed: Jun. 1, 1981

[30] Foreign Application Priority Data

Jun. 6, 1980 [AT] Austria ............................. 2983/80
Jun. 6, 1980 [AT] Austria ............................. 2984/80

[51] Int. Cl.³ ..................... F26B 3/14; F26B 21/06
[52] U.S. Cl. ........................................ 34/20; 34/34; 34/54; 34/169
[58] Field of Search ............... 165/34, 104.34; 34/77, 34/168, 169, 170, 174, 224, 232, 54, 20, 27, 32, 34; 432/77, 95

[56] References Cited

U.S. PATENT DOCUMENTS

| | | | |
|---|---|---|---|
| 1,408,457 | 3/1922 | Harrison | 34/169 |
| 4,106,998 | 8/1978 | Okada et al. | 34/169 |
| 4,360,976 | 11/1982 | Meckel et al. | 34/168 |

*Primary Examiner*—L. I. Schwartz
*Attorney, Agent, or Firm*—Steinberg & Raskin

[57] ABSTRACT

A method and apparatus for cooling hot bulk material in a cooling bunker by passing cooling gas streams therethrough in a manner such that the bulk material is cooled in a uniform manner while avoiding temperature fluctuations of the outflowing heated cooling gas. The cooling gas is passed through the hot bulk material in at least two gas streams, one of which is directed through a core zone of the hot bulk material and another of which is passed through a peripheral zone thereof. The flow rates of the respective cooling gas streams are regulated according to the temperature of the outflowing heated cooling gas which may be sensed by the temperature of a fluid flowing through heat exchanger over which the heated cooling gas passes.

16 Claims, 5 Drawing Figures

METHOD AND APPARATUS FOR COOLING HOT BULK MATERIAL

BACKGROUND OF THE INVENTION

This invention relates generally to methods and apparatus for cooling hot bulk material in a cooling bunker and, more particularly, to methods and apparatus wherein hot bulk material is cooled by passing a stream of cooling gas therethrough.

Still more particularly, the present invention concerns a method and apparatus whereby the flow of cooling gas through a cooling bunker for hot bulk materials is regulated and wherein the cooling gas which is heated after passing through the hot bulk material is recooled in a heat exchanger and returned to the cooling bunker through at least two feed lines.

Arrangements are known for dry cooling coke by injecting cooling gas into a cooling bunker by means of an adjustable blower and wherein the blower operation is regulated according to the cooling requirements. Such conventional arrangements, however, are not entirely satisfactory in that the hot bulk material contained within the cooling bunker tends to become segregated according to grain size resulting in a non-uniform cooling thereof. For example, temperature differences in the bulk material discharged from the outlet of the cooling bunker of between 200°–300° are not uncommon. Furthermore, the cooling gas which passes through the hot bulk material is itself heated in a non-uniform manner and exhibits temperature differences of approximately the same order of magnitude as does the hot bulk material. When such heated cooling gas is used to heat a fluid flowing through a heat exchanger, the non-uniform temperature thereof can result in overheating of the heat exchanger fluid or at least in fluctuations in the output of the heat exchanger.

In order to overcome these disadvantages, it has been proposed to admix a cold cooling gas stream with the hot cooling gas stream. However, this is not satisfactory in that mixing losses necessarily occur.

It has also been proposed in order to overcome the problems noted above to render the volume of coke in the cooling bunker more homogeneous through the provision of a forechamber in the cooling bunker, forming the gas distributor with a multipart design and placing one part of the gas distributor in the peripheral zone of the funnel-like discharge opening of the cooling bunker. However, the use of a forechamber is disadvantageous in that an inverted cone-shaped depression is formed in the bulk material above the gas distributor in the region where the red-hot coke is not cooled, the cooling gas being drawn off only in an annular or peripheral zone of the cooling bunker. In other words, the cooling gas flows essentially rectilinearly from the peripheral zone of the discharge funnel to the gas outlet so that the only advantage provided by the arrangement of a peripheral gas distributor is that an additional cooling gas passage through the coke is formed which at most only slightly improves the cooling conditions. A design of a cooling bunker having a gas evolving surface reduces the extent to which an additional gas passage is formed so that the cooling gas will pass uniformly through only a portion of the hot coke.

It is also conventional to utilize conical gas distributors in cooling bunkers for hot bulk materials. In such arrangements, the tip of the conical gas distributor is disposed in the direction in which the bulk material is charged into the bunker. This in turn causes the cooling gas to pass through the bulk material in a direction which approximates that of a parabola branch which extends toward the wall of the bunker, the flow path also resulting from the fact that the fine grain bulk material becomes situated substantially along the axis of the bunker while the coarse grain bulk material moves in areas adjacent to the bunker wall.

This flow distribution results in an inefficient cooling of the fine bulk material and, furthermore, results in hank formation in the bulk material so that uncooled or inefficiently cooled bulk material will discharge from the bunker. Of course, this is particularly undesirable in the case of hot coke coolers since heat clusters will cause coke burnoff and may also result in damage to transport apparatus onto which the still hot coke is deposited.

SUMMARY OF THE INVENTION

Accordingly, one object of the present invention is to provide new and improved methods and apparatus for cooling hot bulk material in cooling bunkers.

Another object of the present invention is to provide new and improved methods and apparatus for cooling hot bulk material in a uniform manner across the entire cross section of the bunker.

Briefly, in accordance with the present invention, these and other objects are attained by providing a method wherein a control signal determined by the temperature of the cooling gas stream after the same has passed through the hot bulk material and has been heated thereby regulates the distribution of a cooling gas stream through individual feed lines in a manner such that when the temperature of the cooling gas stream flowing out of the cooling bunker increases, the flow of a first gas stream through the core zone of the hot bulk material is reduced while the flow of a second gas stream through the peripheral zone of the hot bulk material is increased.

According to the invention, apparatus are provided wherein regulating valves are provided in respective feed lines into the cooling bunker which determine a minimum cooling gas stream and an adjustable cooling gas stream which exceeds the minimum in order to obtain a thorough mixing of the individual gas streams. More particularly, the apparatus includes a gas distributor having the configuration of a truncated conical shell and which defines a narrow opening which faces in the direction of the discharge opening of the bunker. By appropriately regulating the gas streams, it is possible to improve the flow of the gas stream through the bunker and avoid hank formation in the hot cooling gas as well as the formation of heat clusters in the cold coke. At the same time, an equalization of the temperature of the outflowing cooling gas stream is achieved by the mixing of the two separate cooling gas streams.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DESCRIPTION OF THE PREFERRED EMBODIMENTS

Figure 1:
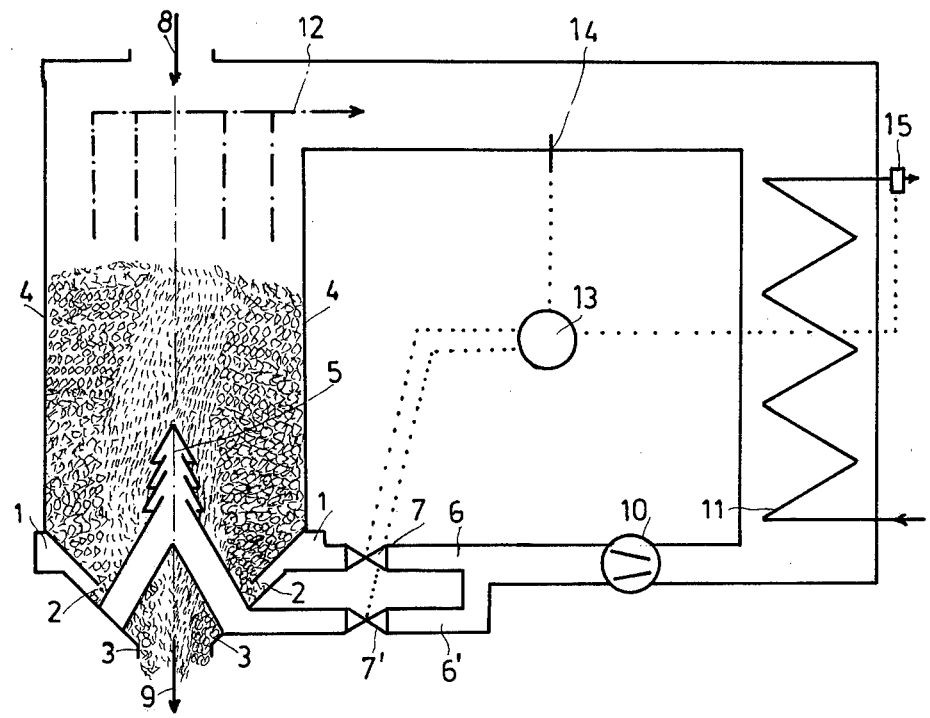
FIG. 1 is a schematic view of a coke drying and cooling installation incorporating the method and apparatus of the present invention.

Referring now to the drawings wherein like reference characters designate identical or corresponding parts throughout the several views, and more particularly to FIG. 1, a cooling bunker 4 for red-hot coke is illustrated having an upper inlet opening through which the red-hot coke is introduced as designated by arrow 8 and a lower funnel-shaped discharge opening 3 through which the cooled coke is discharged as designated by arrow 9.

As described below, two cooling gas streams combine with each other at the upper end of the cooling bunker 4, the cooling gas streams having been heated by virtue of the same passing through the hot coke to cool the same. The heated cooling gas 12 which is collected above the bulk material is directed through a conduit over a heat exchanger 11 which forms part of a heat recovery system whereby the heated cooling gas is recooled. For example, the heat recovery system may comprise a steam generating plant with steam passing through the heat exchanger 11 to which the heated cooling gas gives off its thermal energy.

After leaving the heat recovery installation, i.e., after passing over heat exchanger 11, the recooled cooling gas is supplied by means of a blower 10 into first and second feed lines 6' and 6 which themselves communicate with first and second gas distributors 5 and 1, respectively. Thus, the recooled cooling gas is separated into first and second cooling gas streams which are supplied via feed lines 6' and 6 into respective gas distributors 5 and 1.

Regulating valves 7 and 7' are provided within feed lines 6 and 6' which control the flow rate of the respective cooling gas streams which flow therethrough.

According to the invention, the regulating valves are controlled by means of a transducer 13 which generates control signals which are applied to the regulating valves. The value of the control signal generated by transducer 13 is determined by the temperature of the heated gas stream 12. More particularly, a temperature sensor 14 may be provided within the conduit through which the heated cooling gas 12 passes. Alternatively, the value of the control signal may be determined by means of a sensor 15 disposed in the heat exchanger 11 and in this case, the sensor 15 can measure the quantity of steam flowing through the heat exchanger.

The gas distributor 5 illustrated in FIG. 1 may comprise a known conical gas distributor whose tip points in a direction opposite to the direction in which the bulk material flows in the cooling bunker. The gas distributor 1 is provided in the discharge funnel 3 of the bunker 4 and includes gas outlet openings 2.

In operation, a first cooling gas stream is passed through gas distributor 5 from feed line 6' so as to flow through a core zone of the hot bulk material. Simultaneously, a second cooling gas stream passes through a peripheral zone of the hot bulk material from the second gas distributor 1 from feed line 6. The first and second gas streams are combined into a heated gas stream in the space above the hot bulk material and then directed into the recooling installation which in the illustrated embodiment comprises a heat recovery installation including heat exhanger 11. The recooled heating gas is then fed into the first and second feed lines 6' and 6 by blower 10. In this manner, the heat flow is improved since the cooling gas which rises through the peripheral zone of the bulk material will be cooler than that which passes through the core zone of the hot bulk material. The appropriate flow rates for the first and second gas streams are adjusted by the control signals which are applied to the regulating valves 7 and 7' which, as noted above, is determined by the temperature of the heated cooling gas stream or the temperature of the fluid which flows through the heat exchanger 11. Thus, as the temperature of the outflowing hot cooling gas 12 increases, the rate at which the cooling gas stream flows through the peripheral zone is increased at the expense of the flow rate of the cooling gas stream through the central core zone. In this manner, the regulation of the cooling gas temperature may be controlled with greater sensitivity with the full quantity of cooling gas always being conducted through the bunker. Of course, the regulation of the flow rates of the first and second cooling gas streams may be combined with a regulation of the total flow rates by means of blower 10.

Figure 2:
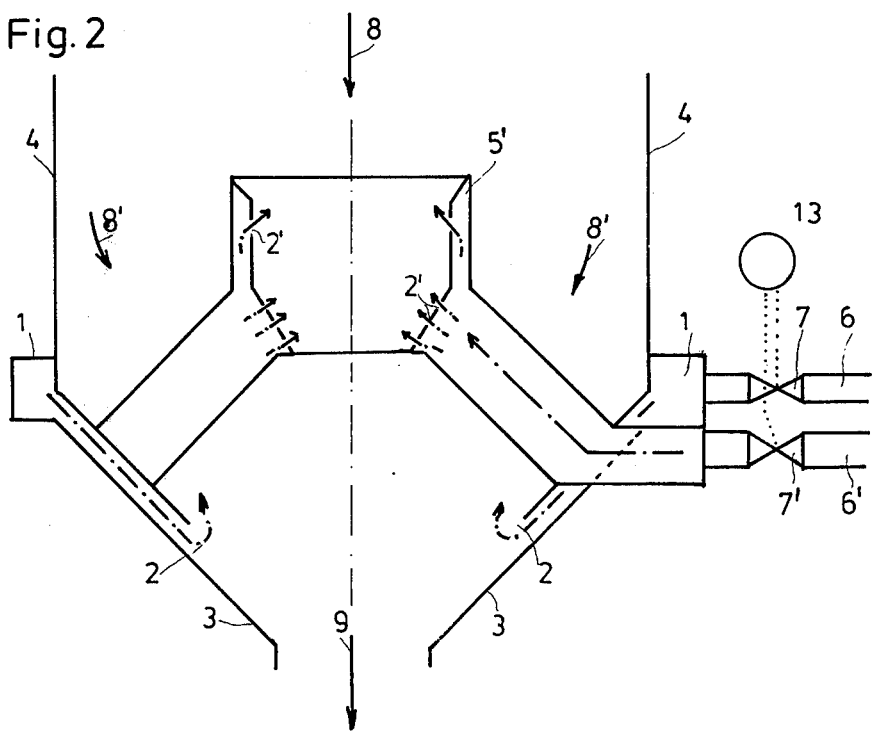
FIG. 2 is a schematic view of an installation according to the present invention and illustrating another embodiment of a gas distributor.

An alternative embodiment of the first gas distributor is illustrated in FIG. 2 and is designated 5'. Thus, the gas distributing apparatus of the embodiment illustrated in FIG. 2 comprises a first gas distributor 5' and a second gas distributor 1, the latter being provided in the discharge funnel 3 of the cooling bunker similar to the gas distributor 1 illustrated in FIG. 1.

The first gas distributor 5' has a truncated conical shell portion, the reduced base portion thereof opening towards the lower discharge opening of the cooling bunker 4. As the hot bulk material travels downwardly through the cooling bunker, the same is divided in the region of gas distributor 5' into a central partial stream 8 and an annular peripheral partial stream 8', each stream of hot bulk material being cooled by means of a respective one of the gas distributors 1 and 5'. The quantity of gas in each gas stream is regulated in the same manner as in the case of the embodiment of FIG. 1, namely through control valves 7 and 7'.

Gas discharge openings 2' are formed in the inwardly facing surface of gas distributor 5' so that as the partial stream 8 of hot bulk material passes through the gas distributor 5', the first cooling gas stream passes through gas discharge openings 2' and flows through the core zone of the hot bulk material. The other partial stream 8' of the hot bulk material which flows through the annular space defined between the outside of the conical shell portion of gas distributor 5' is cooled by the second cooling gas stream supplied from the second gas distributor 1 provided in the discharge funnel 3 of bunker 4.

Both gas distributors 5' and 1 are connected via the gas feed lines 6' and 6 with the recooling installation (not shown). As noted above, the regulating valves 7 and 7' are provided in the gas feed lines 6 and 6' through which the respective quantities of gas in the first and second cooling gas streams are determined. Furthermore, the state of the gas leaving the bulk material cooling bunker can be controlled by means of regulating valves 7 and 7' so that a gas purification system connected to the gas discharge of the cooling bunker can be operated in a favorable manner. Similarly, if the gas is recycled, a reprocessing system can be operated under favorable conditions by suitably adjusting the regulating valves 7 and 7'.

Figure 3:
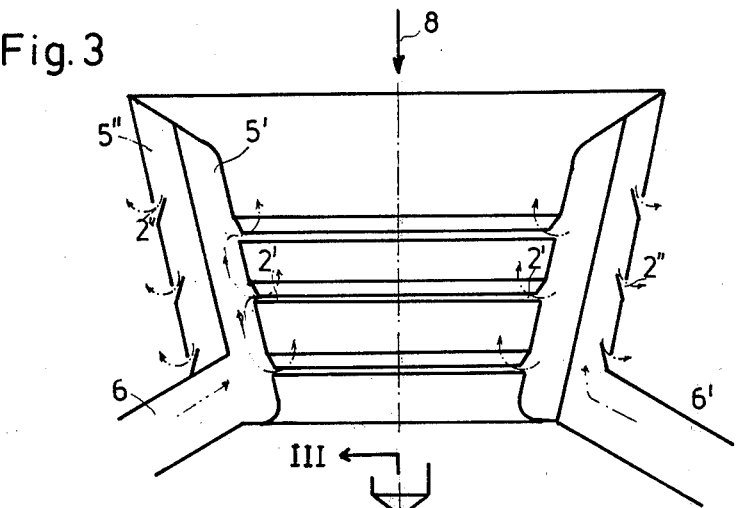
FIG. 3 is a view similar to FIG. 2 illustrating yet another embodiment of a gas distributor for use in connection with the present invention, FIG. 3 constituting a sectional view taken along line III—III of FIG. 4.
Figure 4:
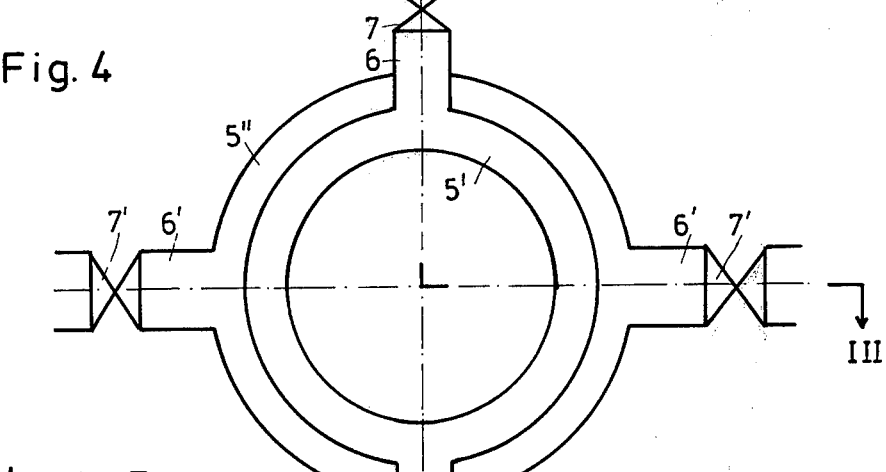
FIG. 4 is a schematic plan view of the gas distributor illustrated in FIG. 3.

Referring now to FIG. 3, another embodiment of the gas distributor apparatus for use in connection with the present invention is illustrated. In this embodiment the first and second gas distributors, i.e., the gas distributors which respectively distribute the first gas stream through the core zone of the hot bulk material and the second cooling gas stream through the peripheral zone of the hot bulk material, are both incororated in a truncated cone-shaped structure. Thus, a first gas distributor 5' has gas discharge slots 2' provided on the inwardly facing surface of the cone-shaped portion while a plurality of gas discharge slots 2" are formed on an outwardly facing surface of the truncated cone-shaped gas distributor 5". The first and second gas distributors 5' and 5" are maintained isolated from each other and respectively communicate with first and second feed lines 6 and 6' as best seen in FIG. 4. As in the case of the previously described embodiments, regulating valves 7 and 7' are provided in the first and second feed lines, the regulating valves being controlled by signals generated from a transducer as determined by the sensing of the temperature of the heated cooling gas stream. The feed lines 6 and 6' constitutes support structure for the gas distributor 5' and 5" in the bulk material stream.

Figure 5:
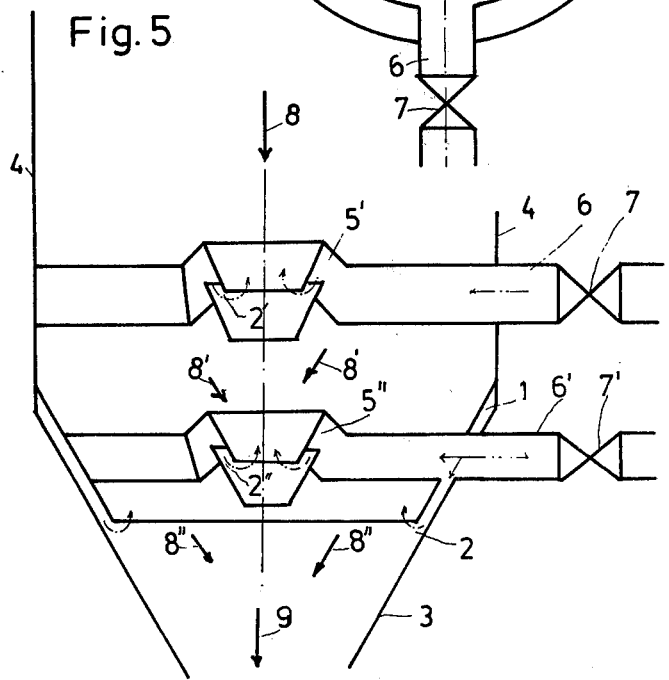
FIG. 5 is a view similar to FIG. 2 illustrating yet another embodiment of a gas distributor for use in connection with the present invention.

Referring now to FIG. 5, a three-part gas distributor apparatus is illustrated wherein the bulk material is in essence cooled in three separate streams, namely a central stream 8 and two outer streams 8' and 8" and in respective gas distributors 1, 5' and 5". The gas distributor 1 is essentially similar to that described above in connection with FIG. 1, being disposed in the discharge funnel 3, the gas being discharged through openings 2 to cool the peripheral bulk material stream 8".

The present invention is especially suitable for cooling hot coke in dry quenching plants. However, it is understood that the invention can be used for cooling other hot bulk materials. Furthermore, the apparatus of the invention is useful in connection with drying plants wherein hot drying gas is supplied to the bunker 4 through the gas distributors, the respective amounts of the drying gas being controlled through the regulating valves 7 and 7'. In such applications, however, it is necessary to provide a liquid separating device in the region of the outflowing gas since the latter will be relatively wet in order that the drying gas can be subsequently processed.

As noted above, by providing for a pair of cooling gas streams to pass through the hot bulk material according to the invention in a manner such that the relative amounts of each gas stream can be varied according to the temperature of the outflowing heated gas stream, overall performance is improved since the cooling gas which passes through the peripheral zone of the bulk material will be cooler than that which is charged into the core zone thereof. Accordingly, upon the temperature of the outflowing heated cooling gas increasing, the flow of the cooling gas stream through the peripheral zone can be increased with a corresponding decrease of the flow of the cooling gas stream through the core zone in order to effect a more sensitive regulation of the cooling gas temperature than was possible heretofore. According to the invention, the full quantity of cooling gas passed through the hot bulk material within the cooling bunker will always be maintained at a maximum. Of course, it is understood that the regulation of the relative amounts of the first and second cooling gas streams can be adjusted in combination with the adjustment of the total quantity of gas supplied through regulation of the blower.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A method of cooling hot bulk material in a cooling bunker comprising the steps of:
    passing a first cooling gas stream from a first feed line through a core zone of the hot bulk material within the bunker;
    simultaneously passing a second cooling gas stream from a second feed line through a peripheral zone of the hot bulk material within the bunker;
    collecting the heated first and second gas streams after the same have passed through the hot bulk material and directing the heated gas stream from the cooling bunker into gas cooling apparatus and recooling the same therein;
    directing the recooled gas stream from the gas cooling apparatus into the first and second feed lines to form the first and second cooling gas streams; and
    regulating the relative flows of the first and second gas streams with respect to each other through the first and second feed lines and through the hot bulk material in response to the temperature of the heated gas stream such that as the temperature of the heated gas stream increases, the flow of the first gas stream through the core zone of the hot bulk material is reduced and the flow of the second gas stream through the peripheral zone of the hot bulk material is increased.

2. The method of claim 1 wherein flow regulating apparatus are provided in the first and second feed lines and wherein said regulating step comprises generating a control signal whose value is determined by the temperature of the heated gas stream and applying said control signal to the flow regulating apparatus in the first and second feed lines.

3. The method of claim 2 wherein the control signal is generated by a temperature sensor disposed in the heated gas stream.

4. The method of claim 2 wherein the gas cooling apparatus comprises a heat exchanger and wherein the control signal is generated by a sensor disposed in a stream of fluid passing through the heat exchanger whose temperature is determined by the temperature of the heated gas stream.

5. The method of claim 4 wherein the fluid passing through the heat exchanger is steam.

6. The method of claim 4 wherein the control signal is determined by the quantity of fluid that is heated to a specific temperature by passing through the heat exchanger.

7. The method of claim 2 wherein said second cooling gas stream from said second feed line is passed through the peripheral zone of the hot bulk material near the walls of the bunker.

8. Apparatus for cooling hot bulk material comprising:
   a cooling bunker having an upper inlet opening and a lower discharge opening through which hot bulk material is charged and discharged into and from the bunker, respectively;
   first means for distributing a first cooling gas stream through a core zone of the hot bulk material within the cooling bunker and second means for distributing a second cooling gas stream through a peripheral zone of the hot bulk material within the bunker;
   a first feed line communicating with said first gas distribution means and having means for regulating the flow of the first cooling gas stream therethrough disposed therein;
   a second feed line communicating with said second gas distribution means and having means for regulating the flow of the second cooling gas stream therethrough disposed therein;
   means for recooling the heated cooling gas after the same has passed through said hot bulk material in said cooling bunker;
   conduit means for directing the heated cooling gas to said recooling means and for directing the recooled cooling gas into said first and second feed lines to form said first and second cooling gas streams; and
   means for controlling the gas flow regulating means in said first and second feed lines in response to the temperature of the heated cooling gas such that as the temperature of the heated gas stream increases, the flow of the first gas stream through the core zone of the hot bulk material is reduced and the flow of the second gas stream through the peripheral zone of the hot bulk material is increased.

9. The combination of claim 8 wherein said cooling gas flow regulating means comprise first and second control valves disposed in said first and second feed lines, respectively.

10. The combination of claim 9 wherein said first and second control valves comprise means for determining a minimum cooling gas stream and a second adjustable cooling gas stream which exceeds the minimum gas stream for flow through said gas distribution means.

11. The combination of claim 8 wherein said first gas distribution means has a truncated conical shell portion and wherein the reduced diameter base portion thereof opens towards the lower discharge opening of said cooling bunker.

12. The combination of claim 11 wherein said cooling bunker includes a lower discharge funnel defining said discharge opening and wherein said first gas distribution means is at least partially situated in the space defined by said discharge funnel.

13. The combination of claim 12 wherein said first gas distribution means includes a surface facing inwardly of said conical shell portion and a surface facing outwardly thereof and wherein gas outlet openings are provided in said inwardly facing surface.

14. The combination of claim 13 wherein gas outlet openings are also provided in said outwardly facing surface of said conical shell portion.

15. The combination of claim 14 wherein said first and second feed lines communicate with said gas outlet openings provided in said inwardly and outwardly facing surface of said conical shell portion, respectively.

16. The method of claim 7 wherein said flow regulating apparatus comprises first valve means in said first feed line and second valve means in said second feed line, said first and second valve means being independently controlled from one another.

* * * * *